United States Patent [19]

Haynes et al.

[11] 4,332,120
[45] Jun. 1, 1982

[54] NUCLEAR FUEL PELLET LOADING APPARATUS

[75] Inventors: John Haynes; Thomas B. Huggins, Sr., both of Columbia, S.C.

[73] Assignee: Westinghouse Electric Corp., Pittsburgh, Pa.

[21] Appl. No.: 127,271

[22] Filed: Mar. 5, 1980

[51] Int. Cl.³ ............................ B65B 5/10; B65B 3/28
[52] U.S. Cl. ....................................... 53/245; 414/99; 193/32
[58] Field of Search ................... 53/236, 245, 246, 248, 53/255; 414/99; 193/27, 32

[56] References Cited

U.S. PATENT DOCUMENTS

| | | | |
|---|---|---|---|
| 1,133,436 | 3/1915 | Gramling | 193/27 X |
| 2,827,082 | 3/1958 | Baum | 53/245 X |
| 2,896,384 | 7/1959 | Carlsen et al. | 53/245 X |
| 3,149,836 | 9/1964 | Ragozzino et al. | 414/99 X |
| 3,187,872 | 6/1965 | Hill et al. | 193/32 X |
| 3,460,685 | 8/1969 | Kirkhof | 414/99 X |
| 3,897,673 | 8/1975 | Kee et al. | 53/246 X |

Primary Examiner—Horace M. Culver
Attorney, Agent, or Firm—J. R. Campbell; Z. L. Dermer

[57] ABSTRACT

This invention provides a loading mechanism for directing nuclear fuel pellets from one elevation to a lower container via gravity. The mechanism includes a loading chute into which the pellets are deposited and a vertically movable platform therebelow supporting a replaceable container to receive the pellets from the chute. The chute includes a plurality of generally oppositely downwardly angled resiliently covered plates defining a zig-zag path through the chute to limit the accumulation of momentum to the pellets, and the platform is spring-biased against the accumulated weight of the pellets and container so as to be continuously lowered as the weight thereof increases as the pellets are deposited in the container.

1 Claim, 6 Drawing Figures

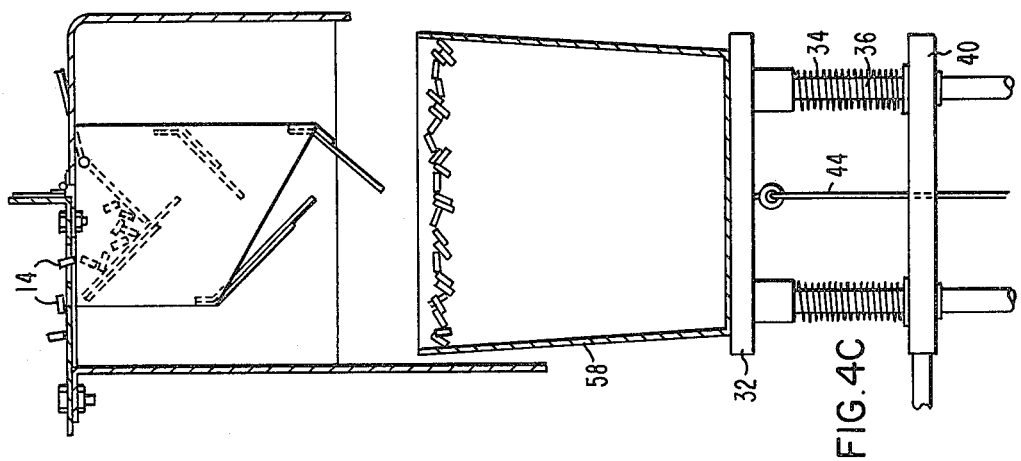
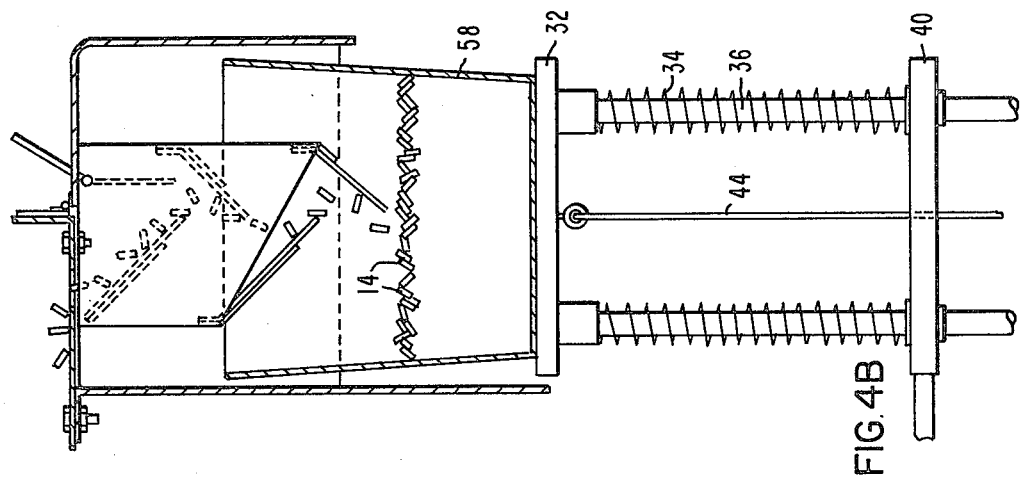
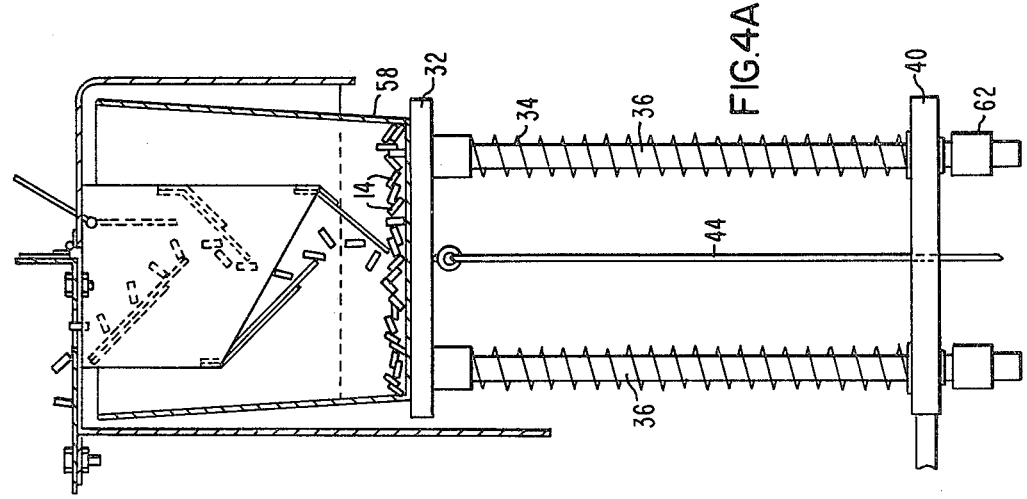

NUCLEAR FUEL PELLET LOADING APPARATUS

BACKGROUND OF THE INVENTION

1. Field of the Invention

The invention described herein relates to gravity-feed loading apparatus and more particularly to apparatus for delivering highly frangible nuclear fuel pellets into a container, such as a sintering boat, prior to further processing the pellets in a system.

2. Description of the Prior Art

The present invention is particularly suitable for delivering green, i.e. unfired, uranium dioxide fuel pellets from the press head of a pelletizing press to a sintering boat for subsequent firing into a ceramic-like fuel pellet used in a fuel rod in a nuclear reactor.

The pellets have a generally cylindrical configuration, with slightly dished-in areas on opposite ends, ranging in size from about 0.3 inches to 0.8 inches long and 0.25 inches to 0.5 inches in diameter. The pellets are formed from uranium dioxide powder which is flowed into the die of the press.

As the power-producing capacity of the array of fuel pellets in a fuel rod is dependent upon their density, it is necessary to obtain generally uniform density among the fired, end product ceramic pellets. Such preferred density is generally on the order of 95% of the theoretical density. However, it is known that various uranium dioxide powders have sufficiently different compaction and firing characteristics so that to obtain a desired end result, the pellets must be formed in the press at different pressures depending upon the inherent characteristics of the feed powder. It is generally known that as the know-how and experience level increased in powder-producing technology, less and less pressure on feed powder in the press was required to yield the desired density of a pellet.

The experience of the corporate assignee of the present invention has typically conformed to the above sequence, thus, during early years of powder-forming technology, when the pressures were required to be relatively high, for example, in the order of 75,000 psi, the resultant green pellet was extremely hard and could be subjected to substantial abuse without chipping or other damage prior to firing. Therefore, the handling technique for removing fuel pellets from the press and depositing them into the firing vessel could be rather crude, and, for the most part, the pellets were permitted to tumble down an inclined ramp from the press head to above the boat and free-fall thereinto. Another arrangement, although more complex, is shown in U.S. Pat. No. 3,897,673, wherein an inclined ramp is used to deliver pellets to a loading zone. However, as pressing pressures decreased because of improved powder producing technology, the required pressing pressure became less and the green pellets formed thereby became softer, and transporting them via a continuous inclined ramp to a lower collecting point resulted in substantial chipping even when the inclined plane had a resilient surface. Such chipping was particularly evident at the end edges of the pellets. This loss of the material from the pellets had the ultimate effect of decreasing the energy producing capacity of the reactor and such damaged pellets were accordingly rejected. Scrap pellets were reworked through a process that permitted the material to be reintroduced into the powder for repressing. Due to the fact that there is always some damage to some of the pellets during manufacturing, all pellets are inspected for defects and classified accordingly as class "A", class "B", or "scrap". It is preferred that fuel rods be filled with class "A" pellets. However, due to the economics involved in reprocessing, a quantity of class "B" pellets (up to 10% of the quantity of class "A" pellets) can be used as "bottom end" pellets in each rod. Class "B" pellets that are produced in excess of the 10% limit are reprocessed along with the "scrap" pellets.

Thus, as the powder producing technology has advanced, it has become increasingly important to provide a mechanism for delivering the soft pellets from the pressing head to a sintering boat in a manner which minimizes damage to pellets and which requires a minimum of operator attention and adjustment of the mechanism and is relatively inexpensive and non-complex.

SUMMARY OF THE INVENTION

The present invention provides a soft pellet delivery mechanism comprising a chute into which the pellets are cammed at the general plane of the press head and which contains a plurality of relatively short inclined planes or baffles, angled downwardly in opposite directions to minimize the increase in the velocity or momentum to the pellets as they tumble therethrough in that they are required to change their direction of travel by each intermediate baffle member. The platform for supporting the sintering boat below the chute is spring biased to an initial position to minimize the free-fall of the pellets from the final baffle to the boat, with the biasing springs calibrated to maintain the general plane in which the pellets are received at a constant level, that is, the platform lowers under the weight of the accumulated pellets to continuously maintain free-fall distance generally constant.

The platform can be manually lowered to a position to free the sintering boat for removal and a blocking plate, within the chute, is pivoted into a position to prevent passage of the pellets through the chute, thereby accumulating the pellets while the boat is being replaced without requiring the press to be stopped.

BRIEF DESCRIPTION OF THE DRAWINGS

FIGS. 4A-4C are views similar to FIG. 2 showing, sequentially, the operation of the loading mechanism of the present invention.

DESCRIPTION OF THE PREFERRED EMBODIMENT

Figure 1:
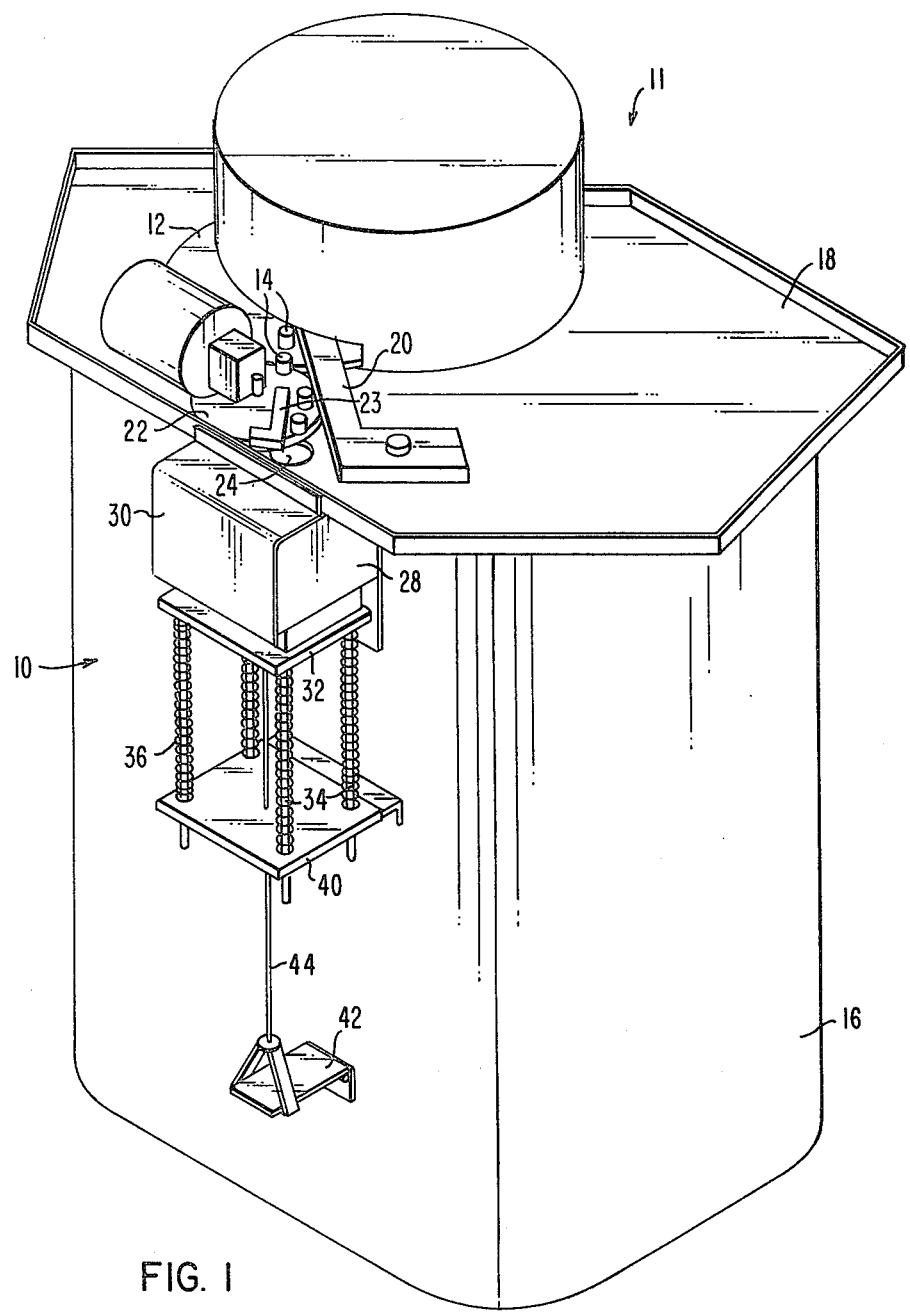
FIG. 1 is an isometric schematic view of a press having a pellet loading mechanism according to the present invention.

Referring to the drawings, FIG. 1 generally illustrates the loading mechanism of the present invention as being mounted on a rotary press. As shown, the loading mechanism 10 is attached to a commercially available rotary press of the type generally known as a rotary tableting press. The press is commercially available Model R7 manufactured by Ateliers de Construction Ed., Courtoy s.p.r.l. Halle, Belgium. This press typically has a horizontally rotating press head providing a table on which the pellets are formed. The pellets are cammed from the table onto a delivery mechanism as the table rotates past a stationary camming arm. In the instant invention, the pellets are cammed onto an adjacent turntable which transports the pellets to beyond the outer structure of the press frame so that, as they are cammed from the turntable, the receptacle into which they are deposited can be substantially directly therebelow. Such second turntable provides a more positive feed mechanism to the entry into the delivery apparatus of the present invention. It should be pointed out that an inclined surface from the level of the press head to the level of the entry into the delivery apparatus would not have sufficient pitch to ensure gravity-feed of the pellets; and, alternatively, providing a surface with sufficient pitch to ensure delivery would, in some instances, permit the pellets to obtain a momentum that produces chips and cracks therein of the nature that the instant invention is designed to minimize.

In FIG. 1, the rotary press 11 includes a horizontally rotatable press table 12 on which the fuel pellets 14 are formed in a vertically cylindrical configuration. The lower housing structure 16 of the press extends beyond the outer edge of the table 12, and a horizontal pan 18 is disposed subadjacent the table and supports an enclosure (not shown) for isolating the pressing operation to confine the dust generated in the pressing operation of the fine uranium dioxide powder. Thus, as previously explained, the pellets 14 must be transported to a position where they can be released, and, through gravity feed, fall to a container below the pan 18 free of the lower housing 16. The pellets 14 are thus cammed from the table 12 by a pellet ejector arm 20 onto an adjacent motor driven horizontally rotating turntable 22 and, in turn, cammed therefrom by a cam bar 23 so as to fall through an opening 24 in the pan 18 in vertical alignment with the entry into the loading mechanism 10 of the present invention.

Figure 2:
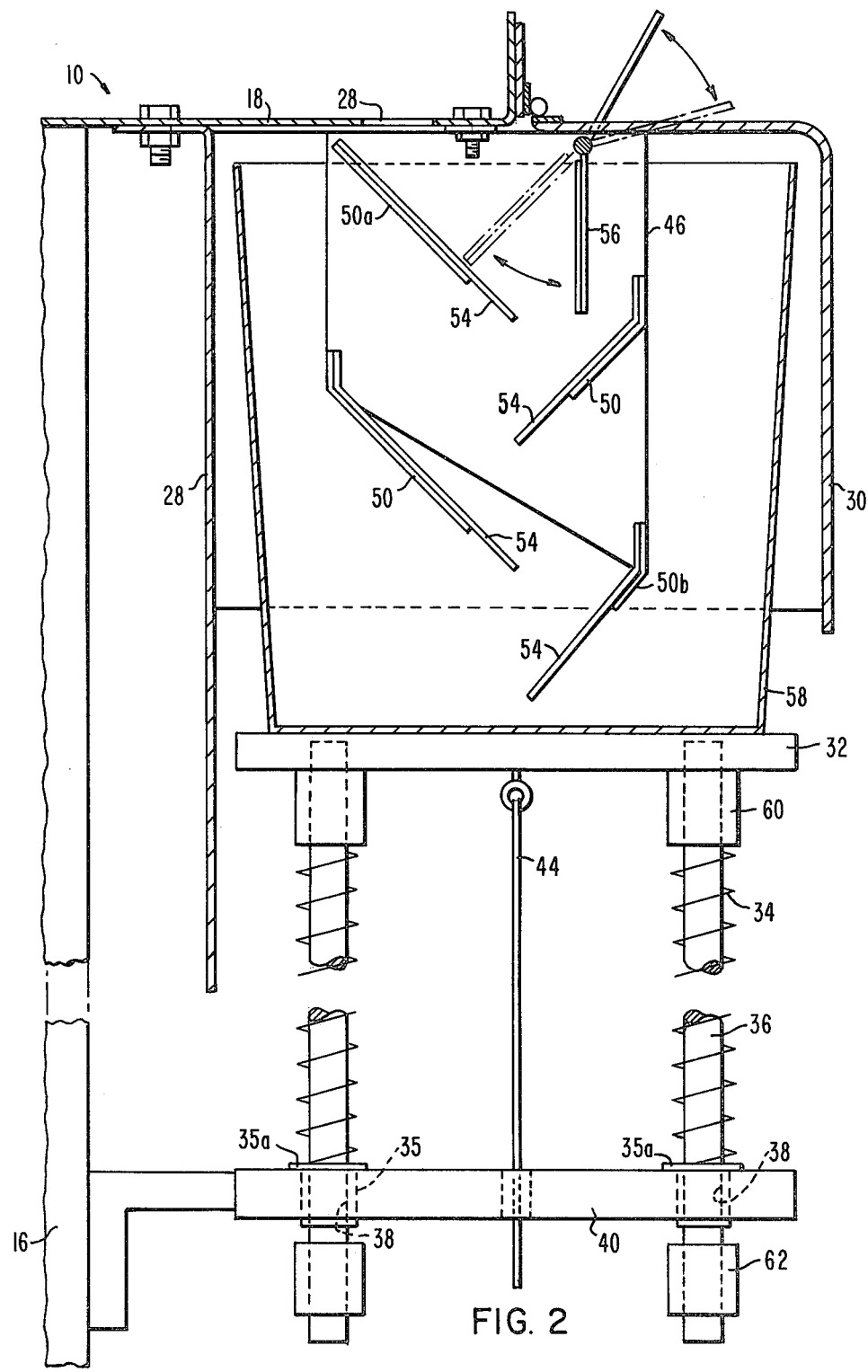
FIG. 2 is an enlarged elevational cross-sectional view of the loading mechanism of the present invention.
Figure 3:
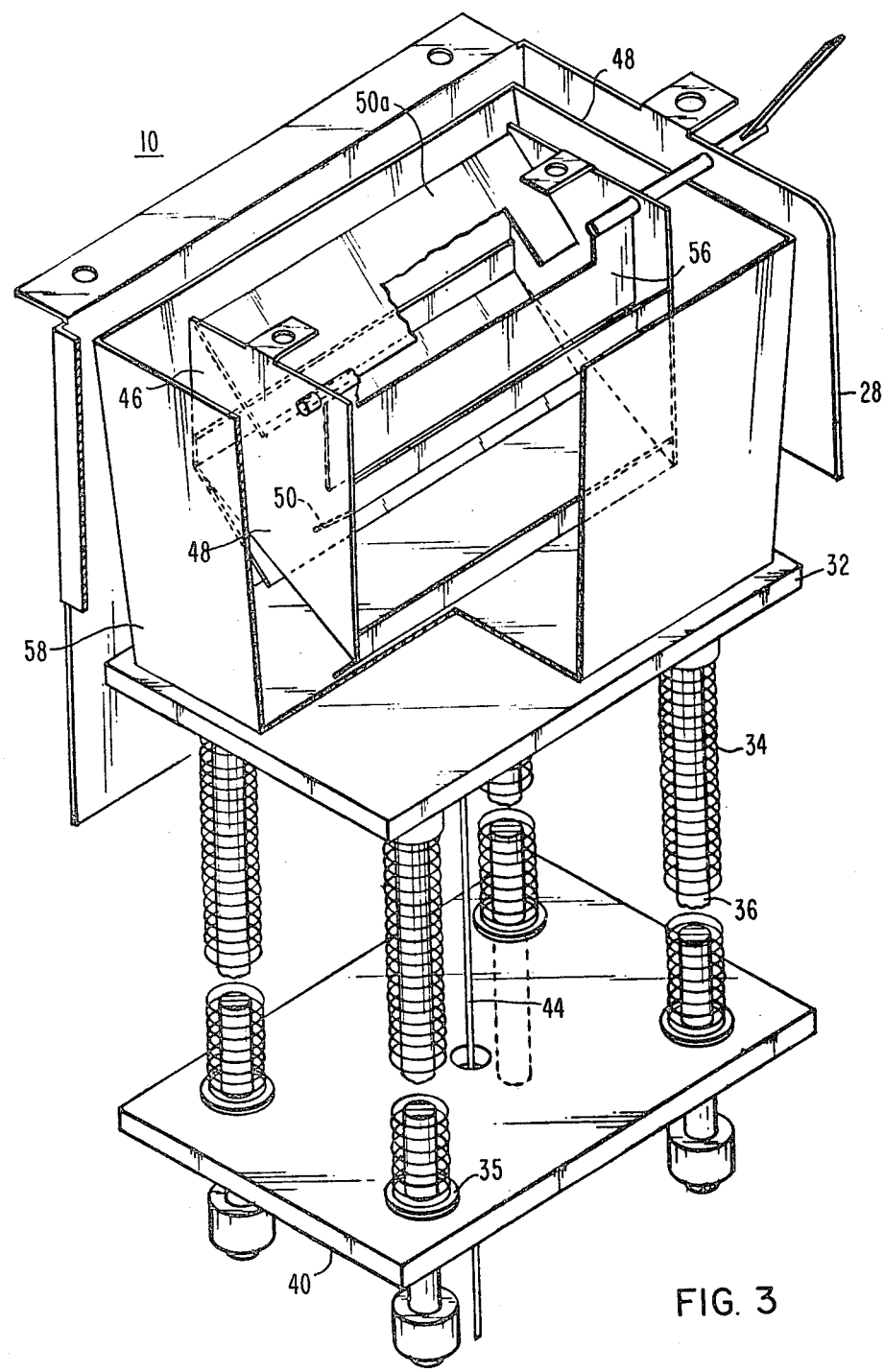
FIG. 3 is an isometric view of the loading mechanism with portions broken away.

It is seen in FIGS. 2 and 3 that the loading mechanism 10 a forwardly open, generally rectangular outer housing 28 attached to the pan 18. A forwardly hinged dust cover lid 30, generally co-extensive with the forward opening, provides access therethrough to the interior of the housing 28.

The housing 28 also opens downwardly and a vertically movable platform 32 is supported thereon by springs 34 normally biasing the platform 32 to an initial position within the housing 28. Four vertically extending guide rods 36 support platform 32, with each rod 36 encircled by a spring 34, and project through bushing members 35 in aligned apertures 38 in a lower stationary support plate 40 attached to the lower housing 16 of the press. The springs 34 abut an enlarged upper collar portion 35a of the bushing members to resiliently support the platform 32 thereabove.

A loading pedal 42, FIG. 1, is pivotally attached to the press housing 16 adjacent the lower end, and is connected, via a cable 44 or the like, to the vertically movable platform 32 by passing through an aperture in the support surface 40 whereby manual operation of the pedal pulls the platform 32 against the biasing force of the springs 34 to a lower position exteriorly of the housing 28 for freely depositing or removing a sintering boat or container thereon.

A stationary chute 46 FIG. 2, enclosed by the housing 28, is secured to the under surface of the pan 18. The chute 46 comprises a pair of opposed vertical side walls 48 having a series of spaced, downwardly inclined, generally short baffle plates or ramps 50, with each plate angled downwardly in a direction generally opposite the direction of the preceding plate to provide, in cross section, a herringbone configuration. The chute 46 is open at the top, with the uppermost baffle plate 50a in general vertical alignment with the opening 28 in the pan 18 and which defines the inlet to the chute 46. The baffle plates 50 are inclined downwardly at a sufficiently steep angle, i.e. on the order of 45°, such that the pellets, as they move through the chute by sliding or tumbling on the plates, are not frictionally prevented from continuous movement.

The preferred embodiment provides a total of four such inclined plates 50 over a vertical drop of about five inches from the inlet to the chute to below the terminal edge of the lowermost plate. Also, the plates 50 are spaced vertically and horizontally a sufficient distance from the adjacent plates to provide an effective passage area therebetween to permit the free movement of pellets without concern for the pellets to become lodged between adjacent plates.

A layer 54 of resilient material is secured over each plate and extends at least to the terminal ends of the plates to cushion the pellets as they land thereon. Also, it is apparent that the resilient layer 54 could extend beyond the end of the plates so as to be less rigid and more cushioning in this extended area which is the primary area of impact of the falling pellets. Thus, it is seen that the pellets must assume a generally zig-zag path through the chute thereby reducing the velocity they would otherwise achieve if their path was a straight drop and thus, likewise, reduce the final impact when they come to rest in the dish.

As earlier stated, the chute 46 also includes a hinged retainer plate 56 attached to the uppermost portion of the chute generally opposite the first baffle plate 50a and manually movable from the initial or non-blocking position into a blocking position (shown in phantom in FIG. 2) whereby it forms a generally trough-shaped compartment in cooperation with the first baffle plate 50a and thereby prevents passage of the pellets through the chute. This blocking plate 56 is moved into a collecting position by the operator whenever the firing vessel below the chute is being replaced. As is seen, the blocking plate 56 is also covered with a layer of resilient material.

As shown in FIG. 3, the firing vessel or container 58 is supported on the vertically movable platform 32 so that the interior bottom of the container is closely adjacent the lowermost inclined plate 50b in the chute. Thus, in its initial position, the walls 58 of the container will enclose a substantial portion of the chute 46. As previously stated and as illustrated in FIGS. 4A and 4B the spring characteristics or constant of the springs 34 are chosen such as to allow the platform and container to be lowered by the added weight of each pellet retained within the container in a manner that permits the plane at which the pellets finally come to rest within the container to be generally constant. This minimizes the vertical fall or drop of all pellets.

Also it is seen in FIG. 3 that the rods 36 extending downwardly from the vertically movable platform 32 are threaded into engagement in the bottom of such platform and a lock collar 60 is jammed thereagainst to maintain this assembly. The springs 34 are compressed between the lock collar 60 and the enlarged head 35a of the bushings 35. Also lock collars 62 below the support platform 40 provide an upper travel stop to the bias of the springs 34 to maintain the initial (i.e. empty) position of the movable platform 32 within the housing 28.

Reference is made to FIG. 4C to illustrate the relative position of the platform 32 after the sintering boat 58 becomes filled and the platform is manually lowered to be freely removable. In such condition the retainer plate 56 is moved to a blocking position to prevent the pellets from falling through the chute 46 during this changeover.

It will be apparent that in light of the above teaching many modifications and variations will occur to those skilled in the art. It therefore is to be understood that within the scope of the appended claims, the invention may be practiced other than as specifically described.

We claim:

1. Pellet loading apparatus comprising:
    a stationary base supporting a housing having a container therein arranged to receive nuclear fuel pellets from a pellet discharge mechanism;
    a chute attached to the upper part of said housing, the inlet to said chute being positioned immediately beneath an opening which discharges pellets from the pellet discharge mechanism into the chute inlet, said chute defining a gravity feed flow path consisting of vertically disposed zig-zag plates extending from the chute inlet to its outlet;
    a mechanism positioned below said chute to receive pellets discharged from the chute outlet;
    said mechanism including the stationary base which supports the housing;
    multiple guide arms extending vertically through said stationary base and terminating at their upper ends in a horizontal disposed platform, said arms being mounted for sliding movement vertically in said base, and biasing springs on each of said arms between the base and platform for constantly biasing the platform in an upward direction;
    a removable pellet container adapted to be positioned on said platform, said container having a size and configuration such that it encloses substantially the complete chute when empty and biased to an uppermost position, and stops on said arms which limit platform movement upwardly;
    said springs having constants such that when the container is placed on the platform and gradually loaded with pellets, pellet weight therein causes the springs to gradually compress and thus always maintain the level of pellets in the container at substantially the same distance beneath the outlet of said chute during the filling operation, to thereby limit the falling distance of pellets into the container; and
    actuation means beneath said base connected with said platform for moving the platform vertically against the normal bias of said springs to permit placing and removing the container on said platform.

* * * * *